(12) United States Patent
Secall (10) Patent No.: US 9,966,992 B2
(45) Date of Patent: May 8, 2018

(54) PORTABLE COMMUNICATION DEVICE WITH TUNABLE ANTENNA AND METHOD OF OPERATING SUCH PORTABLE COMMUNICATION DEVICE

(71) Applicant: Sonova AG, Stäfa (CH)

(72) Inventor: Marc Secall, Constantine (CH)

(73) Assignee: Sonova AG, Staefa (CH)

( * ) Notice: Subject to any disclaimer, the term of this patent is extended or adjusted under 35 U.S.C. 154(b) by 0 days. days.

(21) Appl. No.: 15/303,312

(22) PCT Filed: Apr. 16, 2014

(86) PCT No.: PCT/EP2014/057715
§ 371 (c)(1),
(2) Date: Oct. 11, 2016

(87) PCT Pub. No.: WO2015/158374
PCT Pub. Date: Oct. 22, 2015

(65) Prior Publication Data
US 2017/0041043 A1    Feb. 9, 2017

(51) Int. Cl.
*H04B 1/18* (2006.01)
*H04B 1/40* (2015.01)
(Continued)

(52) U.S. Cl.
CPC ......... *H04B 1/7156* (2013.01); *H04B 1/1027* (2013.01); *H04B 1/18* (2013.01); *H04B 1/40* (2013.01); *H04B 1/713* (2013.01); *H04B 17/318* (2015.01); *H04B 2001/71563* (2013.01); *H04R 2225/55* (2013.01)

(58) Field of Classification Search
CPC .......... H04B 1/1027; H04B 1/18; H04B 1/40; H04B 1/713; H04B 1/7156; H04B 17/318; H04B 2001/71563; H04R 2225/55
See application file for complete search history.

(56) References Cited

U.S. PATENT DOCUMENTS 5,136,719 A    8/1992    Gaskill et al.
6,907,234 B2    6/2005    Karr et al.
(Continued)

FOREIGN PATENT DOCUMENTS

EP    2 434 652 A1    3/2012
EP    2 552 017 A1    1/2013
(Continued)

*Primary Examiner* — David B. Lugo (57) ABSTRACT

A portable communication device having a transceiver unit (30) for establishing a wireless communication link (16) using a digital modulation scheme with a packet-based frequency hopping scheme including at least one advertising channel, an antenna (32), an antenna tuning circuit (34) connected to the transceiver unit and the antenna for tuning the antenna, and a control unit (36) for controlling the antenna tuning circuit. The transceiver unit is adapted to estimate the strength of signals received in the at least one advertising channel and to supply the control unit with a signal representative of the estimated signal strength in the at least one advertising channel. The control unit is adapted to control the antenna tuning circuit such that the antenna is tuned according to the signal representative of the estimated signal strength in the at least one advertising channel.

16 Claims, 4 Drawing Sheets

(51) Int. Cl.
　　　*H04B 1/713*　　　(2011.01)
　　　*H04B 17/318*　　(2015.01)
　　　*H04B 1/7156*　　(2011.01)
　　　*H04B 1/10*　　　(2006.01)

(56) References Cited

U.S. PATENT DOCUMENTS

| | | |
|---|---|---|
| 7,817,969 B2 | 10/2010 | Castaneda et al. |
| 7,844,242 B2 | 11/2010 | Rofougaran et al. |
| 8,068,800 B2 | 11/2011 | Kroeger et al. |
| 8,218,487 B2 | 7/2012 | Eliezer et al. |
| 8,391,817 B2 | 3/2013 | Noel |
| 8,442,248 B2 | 5/2013 | Solum |
| 9,432,780 B2 | 8/2016 | Solum |
| 2006/0099923 A1* | 5/2006 | Wildhagen ........... H03G 3/3052 455/234.1 |
| 2007/0222697 A1* | 9/2007 | Caimi .................... H01Q 1/243 343/861 |
| 2008/0092192 A1* | 4/2008 | Rofougaran ............. H04B 1/18 725/118 |
| 2012/0310395 A1 | 12/2012 | El-Hoydi |
| 2014/0044021 A1* | 2/2014 | Alberth, Jr. ............ H04B 1/525 370/278 |
| 2014/0188348 A1* | 7/2014 | Gautama ............... B60W 10/30 701/48 |

FOREIGN PATENT DOCUMENTS

| | | |
|---|---|---|
| GB | 2 406 479 A | 3/2005 |
| WO | 2006/020520 A2 | 2/2006 |
| WO | 2012/084026 A1 | 6/2012 |

\* cited by examiner

PORTABLE COMMUNICATION DEVICE WITH TUNABLE ANTENNA AND METHOD OF OPERATING SUCH PORTABLE COMMUNICATION DEVICE

BACKGROUND OF THE INVENTION

Field of the Invention

The invention relates to a portable communication device, such as a hearing instrument, comprising a transceiver unit for establishing a wireless communication link using a digital modulation scheme with a packet-based frequency hopping scheme and an antenna.

Description of Related Art

Antennas for integration in miniature communication systems, such as hearing aids, need to be small, efficient and have to satisfy specific requirements in terms of bandwidth. Due to physical limitations (Chu-Harrington limit), meeting all criteria at the same time is not possible, so that a small antenna can be either broadband at the expense of efficiency or more efficient if bandwidth is sacrificed.

The required bandwidth of an antenna is given by the application it is used for. Typically, an additional bandwidth margin is foreseen to compensate for detuning of the antenna by its environment which may happen, for example, due to the influence by the user interacting with the communication device.

In channel-based systems a whole frequency band needs to be covered, even if the particular communication channel requires only a fraction of the spectrum allocated to the band. An example of such an application is the Bluetooth Low Energy standard, which operates in the ISM frequency band from 2.400 to 2.484 GHz. This frequency band is divided into 40 channels, each channel having a bandwidth of only 2 MHz. Even though the size of each individual channel is rather small, a Bluetooth antenna needs to cover the whole bandwidth of at least 84 MHz, leading to a reduced efficiency compared to the case where just a single channel is covered.

Antenna efficiency directly impacts the link budget of the whole system. In particular, for battery powered devices transmit power is quite limited and cannot be arbitrarily increased. In addition, receiver sensitivity is bound to physical limits. Thus, antenna inefficiency cannot be compensated for, resulting in a reduced communication range.

A tuned antenna system may typically overcome such seemingly conflicting requirements of a small and efficient antenna by reducing antenna bandwidth to the minimum required by a single channel. Such a system adapts the antenna resonance frequency with a tuning circuit.

According to one approach, the antenna resonance frequency is adapted based on the selected channel. This approach requires that the antenna bandwidth is larger than the channel bandwidth in order to compensate for component tolerances and antenna detuning caused by the environment. Hence, this solution does not achieve the best possible antenna efficiency.

According to an alternative approach, the antenna resonance frequency is dynamically adjusted, based on the selected channel, as well as a measure of the antenna reflection coefficient. This approach allows to have an antenna with the lowest possible bandwidth and thus the highest efficiency, as well as being capable of compensating for any detuning effects caused by the antenna's environment. However, also this approach has some drawbacks. First, a directional coupler in the path between the transceiver and the antenna is required. Such a coupler introduces additional losses and can take up significant space. Second, the tuning can only be done in transmit operation. Third, a power detection circuit is required to measure the amount of reflected energy from the antenna.

U.S. Pat. No. 7,817,969 B2 relates to FM receiver system for establishing communication between devices like a mobile phone, a laptop computer, a personal computer or a PDA, wherein the FM antennas are tuned in order to alter the center frequency of the FM antenna gain profile to compensate for environmental changes; in a recovery operation mode and in a tracking operation mode the FM antenna control circuitry provides frequency hopping across the FM frequency band at a scanning frequency interval and at a dithering frequency interval which is less than the scanning frequency interval, respectively. A similar system is described in U.S. Pat. No. 7,844,242 B2.

U.S. Pat. No. 8,391,817 B2 relates to a method of tuning an antenna used in data transmission, wherein a first signal strength indicator (RSSI) indicating a signal strength of a first data signal transmitted by an antenna on a first frequency is received, a second RSSI indicating a signal strength of a second data signal transmitted by the antenna on a second frequency different to the first frequency is received, and a tuning control signal is determined based on the first RSSI and the second RSSI, with the antenna being tuned based on the control signal. The RSSI may be checked before any signal measurement is done in order to avoid measuring in the presence of interference; for example, it may be checked that RSSI is below a defined threshold.

U.S. Pat. No. 5,136,719 relates to a method of tuning a radio antenna in a wrist watch paging receiver which is periodically activated to receive packets of information. The antenna is automatically tuned on a periodic basis prior to the receipt of a packet of information. During each tuning operation, the antenna is swept across an entire tuning range to an optimum level, with a RSSI signal being monitored to detect the value of the tuning element that produces the maximum RSSI signal.

European Patent Application EP 1 782 578 A2 and corresponding International Patent Application Publication WO 2006/020520 A2 relate to a wireless communication medium in WLANs, wherein the results of physical measurements, such as the RSSI, are used for antenna calibration.

EP 2 434 652 A1 relates to an antenna which is tuned according to the value of a quality function based on the RSSI and a power indicator.

U.S. Pat. No. 8,068,800 B2 relates to a tuning method of electrically small radio receiver antennas, wherein the RSSI is used to produce a control voltage which controls a capacitance in an antenna matching circuit such that the ratio of a change in the RSSI to a change in the control voltage is minimized.

European Patent Application EP 2 552 017 A1 relates to the minimum distance problem in a wireless communication link between mobile devices. An automatic gain control (AGC) gain value is automatically determined in the receiver for application to an AGC input signal to provide an appropriate signal level of the recovered electric signal when the level of the AGC input signal is in a range between a minimum signal level and a maximum signal level corresponding to maximum and minimum AGC gain values, respectively; the impedance matching of the antenna to the receiver is changed in the impedance matching circuit based on the AGC gain value.

International Patent Application Publication WO 2012/084026 A1 relates to a system comprising a telephone at a hearing aid, wherein the analog signal to the loudspeaker of the telephone is picked up and digitalized at the telephone; the digital signal then is wirelessly transmitted to the hearing aid using the radio transceiver at the telephone, coupling with a radio at the hearing aid. Parameters of the hearing aid can be adjusted by tones sent over a telephone network to the telephone and from there to the hearing aid radio circuit; the hearing aid is adapted for tuning the electrical components of the hearing aid upon detection of a certain tone signal and for tuning an antenna of the radio circuit.

U.S. Pat. No. 9,432,780 B2 relates to wireless communication of information for a hearing assistance device including a multi-mode radio adapted to provide communications at different frequencies using frequency control. An antenna matching circuit is programmable for a selected frequency of operation of the multimode radio.

SUMMARY OF THE INVENTION

It is an object of the invention to provide for a portable communication device comprising a transceiver unit for establishing a wireless communication link using a digital modulation scheme with a packet-based frequency hopping scheme, which achieves a particularly high antenna efficiency without the need for a directional coupler and a power detection circuit and without the restriction that tuning is only possible during transmission operation.

It is a further object to provide for a method of operating such portable communication device.

According to the invention, these objects are achieved by a portable audio device and method as described herein.

The invention is beneficial in that, by estimating the strength of signals received in at least one advertising channel of the frequency hopping scheme and tuning the antenna according to a signal representative of the estimated signal strength in the at least one advertising channel, the highest possible antenna efficiency may be obtained, while avoiding the need for measuring an antenna reflection coefficient; in particular, estimating the received signal strength in an advertising channel provides for a relatively high likelihood that actually a signal is received during a certain measurement period (in frequency hopping schemes the advertising channels have fixed, known frequencies and are used even by devices which are presently not synchronized to the device of the antenna which is to be calibrated; further, typically the hopping frequency, i.e., the rate at which the channels are changed, could potentially be so high that the antenna calibration could not be done during the time of a single hop even if both the transmitter and the respective receiver are synchronized). Further, advertising channels are typically placed in such a way that they are robust to most common interferers, for example, WiFi signals, and that they are spaced apart as much as possible; also, the packet traffic in the advertising channels typically is of periodic nature and thus is predictable.

Typically, the portable communication device is a hearing instrument device, a hearing assistance device, an auditory prosthesis device or an accessory device of such device and is adapted to transmit audio data via the wireless link. Typically, the frequency hopping scheme uses frequencies von 2.400 to 2.484 GHz in the ISM band.

According to one embodiment, the signal representative of the estimated signal strength is an RSSI value.

According to an alternative embodiment, the signal representative of the estimated signal strength is an amplitude of a gain regulation loop in an automatic gain control (AGC) unit; this option is preferred if there is no dedicated RSSI measurement block provided in the portable audio device.

According to one embodiment, the antenna is tuned such that the estimated signal strength in the at least one advertising channel is maximized. According to an alternative embodiment, the antenna is tuned such that the variation of the estimated signal strength within a given frequency range is minimized.

Preferably, a judgment as to whether or not there is an interferer present is done for each estimation of the received signal strength, and the result of the estimation is used only in case that it has been judged and that there is no interferer present. Preferably, an estimation of the received signal strength is conducted during a listening period which is periodically repeated at times when reception of a data signal via the wireless link is to be expected in the at least one advertising channel. The listening period may be divided into a guard period followed by an observation period, and it may be decided that there is no interferer if no signal with an amplitude above a given minimum signal threshold is detected within the guard period and if further the variation of the detected signal within the observation period, at times where the signal amplitude is above a minimum signal threshold, is within a given signal variation range.

According to an alternative embodiment, a judgment with regard to the presence of an interferer can be made by determining whether or not a data packet received in the at least one advertising channel during measurement of the received signal strength has been correctly received, wherein it is judged that an interferer is present in case that the data packet has not been correctly received (for verifying the data packet, the data packet typically contains a CRC value).

Hereinafter, examples of the invention will be described with reference to the accompanying drawings.

DETAILED DESCRIPTION OF THE INVENTION

Figure 1:
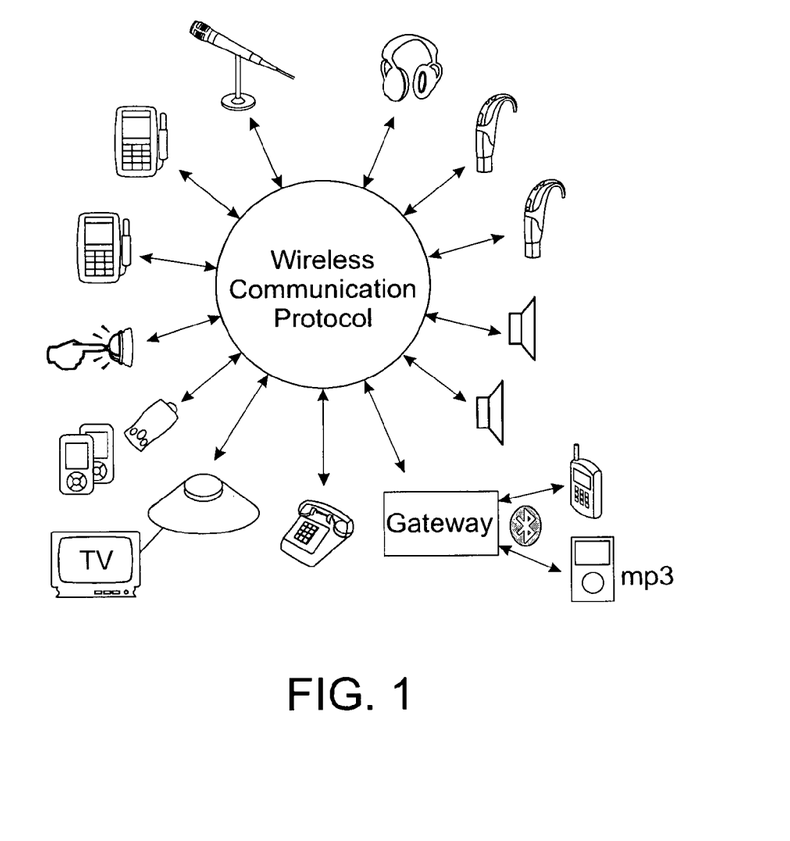
FIG. 1 is a schematic illustration of a system comprising a plurality of wirelessly connected devices, including an example of a portable communication device according to the invention.

FIG. 1 shows a schematic example of a wireless communication network of audio devices and accessories of audio devices, with the devices exchanging audio data and/or control data, for example, data concerning volume control or status information, via a wireless link. Such communication network may include ear-worn audio devices, such as a hearing instrument, a hearing assistance device or an auditory prosthesis device, body-worn accessory devices of such ear worn devices, such as an audio streaming device or a wireless microphone, and other devices which may be connected to such accessory devices or ear level audio devices, such as a telephone device, a mobile phone, an audio or video player, an acoustic alarm system, like a door bell, a fire alarm or a baby monitor, a television device, a gateway to audio sources like a mobile phone, music player, etc. In general, the ear level audio devices may be designed for hearing impaired persons or for normal hearing persons.

The communication network may include a plurality of devices on the receiver side, for implementing a network architecture, usually in a master-slave topology. The ear level audio devices may have an integrated transceiver unit, or a transceiver unit may be connected to the ear level device, for example, via an audio shoe.

Some details of an example of the protocol of the wireless digital link of the communication network will be discussed by reference to FIGS. 2 and 3. Typical carrier frequencies for the digital link are 865 MHz, 915 MHz and 2.45 GHz, wherein the latter band is preferred. Examples of the digital modulation scheme are PSK/FSK, ASK or combined amplitude and phase modulations such as QPSK, and variations thereof (for example, GFSK).

Data transmission may occur in the form of TDMA (Time Division Multiple Access) frames comprising a plurality of time slots (for example, 10), wherein in each slot one data packet may be transmitted. In FIG. 2 an example is shown wherein the TDMA frame has a length of 4 ms and is divided into 10 time slots of 400 µs, with each data packet having a length of 160 µs.

Alternatively, other time division schemes may be used, such as a time division duplex (TDD) (used for example, in the Bluetooth Classic protocol), where one slot is reserved for communication between a master and a slave, and the following slot is reserved for communication from the slave to the master.

The wireless link 16 uses a frequency hopping scheme, preferably a slow frequency hopping scheme, wherein each slot may be transmitted at a different frequency according to a frequency hopping sequence calculated by a given algorithm in the same manner by a transmitting device 10 and a receiving device 14 (FIG. 3), wherein the frequency sequence may be a pseudo-random sequence depending on the number of the present TDMA frame (sequence number), a constant odd number defining the hopping sequence (hopping sequence ID) and the frequency of the last slot of the previous frame.

The first slot of each TDMA frame (slot 0 in FIG. 2) may be allocated to the periodic transmission of a beacon packet which contains the sequence number numbering the TDMA frame and other data necessary for synchronizing the network, such as the list of good channels to be used in the adaptive frequency hopping sequence, such as information relevant for the audio stream, such as description of the encoding format, description of the audio content, gain parameter, surrounding noise level, etc., information relevant for multi-talker network operation, and optionally control data for all or a specific one of the receiver units.

The second slot (slot 1 in FIG. 2) may be allocated to the reception of response data from slave devices (usually the receiver units) of the network, whereby the slave devices can respond to requests from the master device through the beacon packet. At least some of the other slots are allocated to the transmission of audio data, wherein each audio data packet is repeated at least once, typically in subsequent slots.

Figure 2:
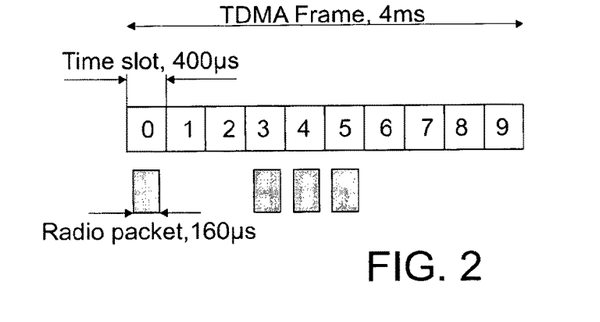
FIG. 2 is an example of a TDMA frame structure which may be used in a system like that of FIG. 1.
Figure 3:
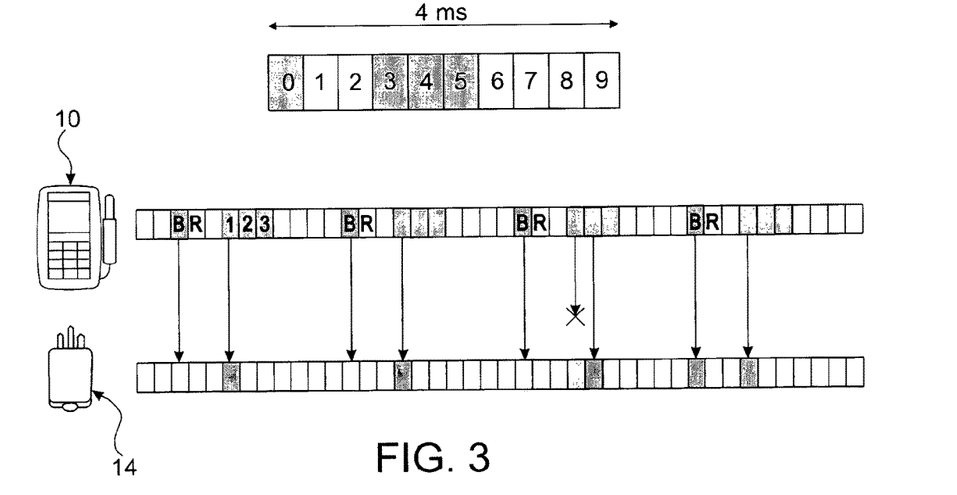
FIG. 3 is an illustration of an example of the protocol of the digital link which may be used in a system like that of FIG. 1.

In the example shown in FIGS. 2 and 3 slots 3, 4 and 5 are used for three-fold transmission of a single audio data packet. The master device does not expect any acknowledgement from the slaves devices (receiver units), i.e., repetition of the audio data packets is done in any case, irrespective of whether the receiver unit has correctly received the first audio data packet (which, in the example of FIGS. 2 and 3, is transmitted in slot 3) or not. Also, the receiver units are not individually addressed by sending a device ID, i.e., the same signals are sent to all receiver units (broadcast mode).

Rather than allocating separate slots to the beacon packet and the response of the slaves, the beacon packet and the response data may be multiplexed on the same slot, for example, slot 0.

Each audio data packet may comprise a start frame delimiter (SFD), audio data and a frame check sequence, such as CRC (Cyclic Redundancy Check) bits. Preferably, the start frame delimiter is a 5 bytes code built from the 4 byte network ID provided by the network master during pairing. This 5 byte code is called the network address, being unique for each network.

Typically, protocols employing frequency hopping use so-called "advertising channels" which are transmitted at fixed specific frequencies in order to enable rapid connection to the network of devices that are not yet synchronized to the frequency hopping scheme. For example, advertising channels may be used for exchanging pairing information or synchronization information.

Typically, such advertising channels have frequencies that are robust to most common interferers, such as WiFi signals, and which are spaced apart as much as possible.

Figure 4:
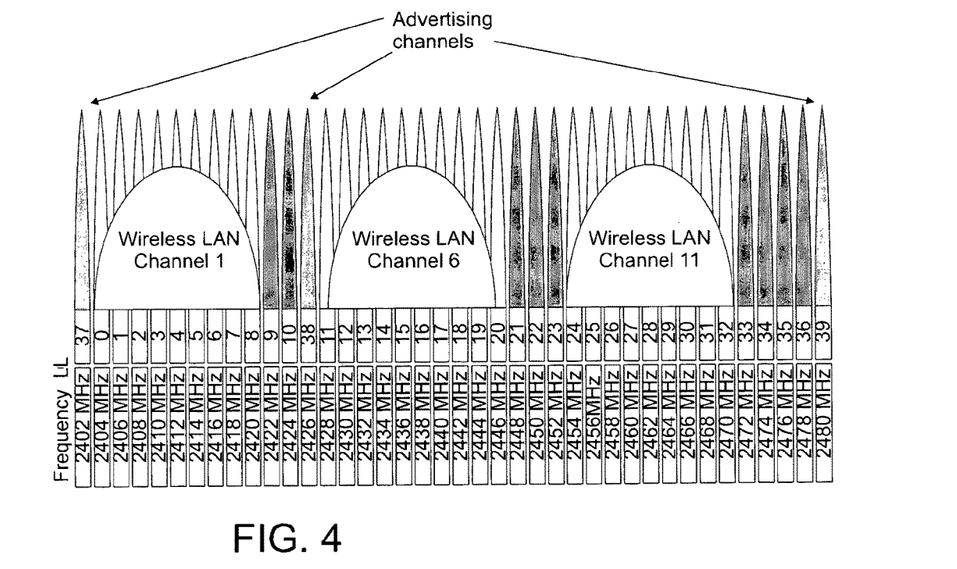
FIG. 4 is an illustration of the channel distribution in a Bluetooth Low Energy frequency hopping system.

In FIG. 4 an example of the placement of the advertising channels in the Bluetooth low energy protocol is shown (channels number 37, 38 and 39).

Figure 5:
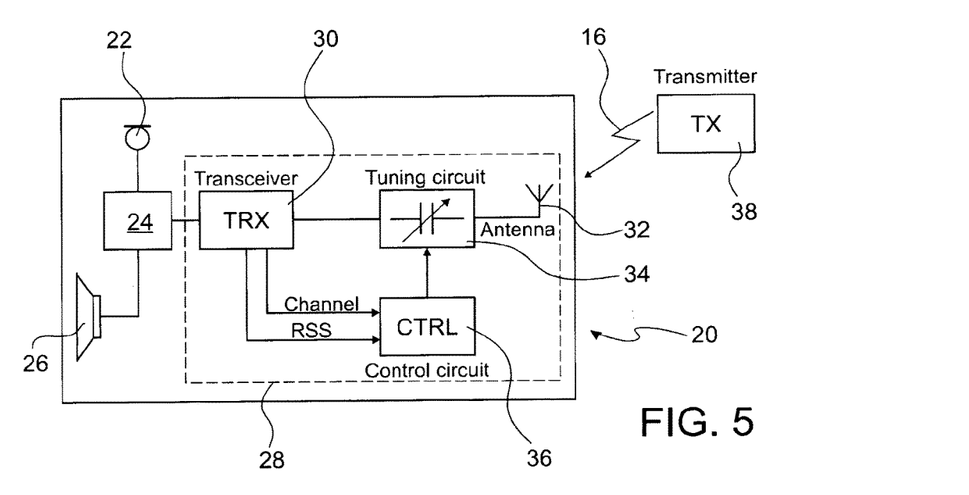
FIG. 5 is a block diagram of an example of a portable communication device according to the invention.

In FIG. 5 a block diagram of an example of an ear level hearing instrument 20, such as a hearing aid, is shown, comprising a microphone arrangement 22 for capturing audio signals from ambient sound, an audio signal processing unit 24 for processing the captured audio signals, an output transducer (loudspeaker) 26 for supplying sound corresponding to the processed audio signals to the user, and a transceiver assembly 28 which comprises a transceiver unit 30, an antenna 32, an antenna tuning circuit 34 connected to the transceiver unit 30 and the antenna 32 for tuning the antenna, and a control unit 36 for controlling the antenna tuning circuit 34. The transceiver assembly or wireless interface 28 serves to exchange data, in particular audio data, with an external device 38 via the wireless link 16.

The transceiver unit 30 is adapted to estimate the strength of signals received in at least one advertising channel of the protocol of the link 16 and to supply the control unit 36 with the signal representative of such estimated signal strength. Typically, the transceiver unit 30 is adapted to measure the RSSI value for the received signal, with the measured RSSI value being supplied to the control unit 36.

Further, the transceiver unit 30 supplies a signal labeled "channel" in FIG. 5 to the control unit 36 in order to tune the antenna in a manner so as to change the resonance frequency according to the frequency hopping scheme required by the network protocol of the link 16 (for example, the resonance frequency may be changed in such a manner that the 40 channels of the example of FIG. 4 are changed according to a sequence given by the network protocol).

The RSSI value determined for the signals received in at least one of the advertising channels is used to calibrate the antenna 32 in the sense that the antenna 32 is tuned within the respective advertising channel such that the RSSI value is maximized (according to an alternative approach, the antenna 32 may be tuned such that the variation of the RSSI value within a given frequency range is minimized). Such "fine tuning" of the antenna 32 serves to maximize the antenna efficiency in particular in cases in which the impedance of the antenna is changed due to changes in the environment of the antenna 32, such as by an object approaching the antenna 32.

Figure 6:
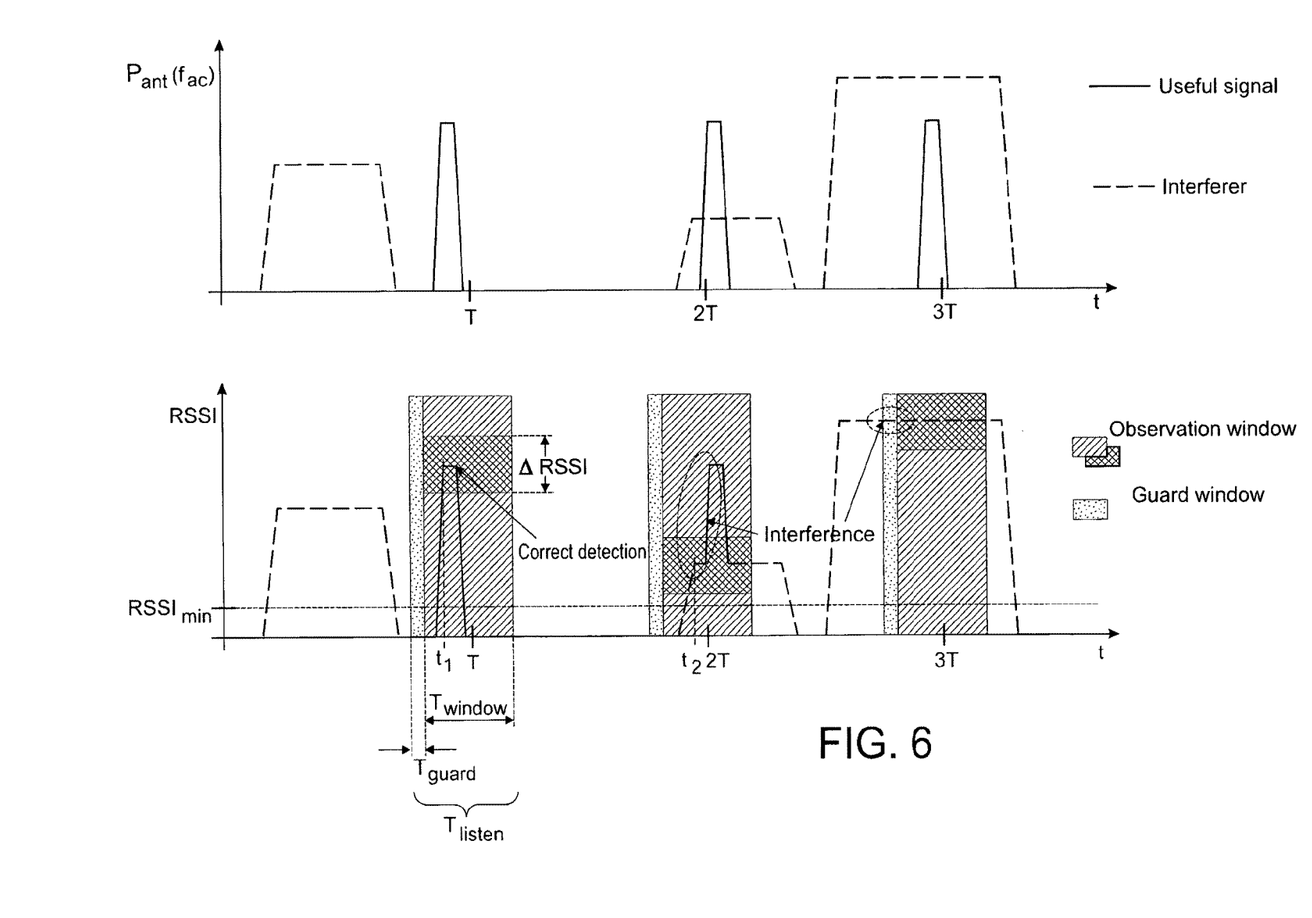
FIG. 6 are graphs showing an example of the power received at the antenna of the transceiver of an communication device according to the invention as a function of time (top) and the respective RSSI value as determined by the transceiver unit (bottom).

FIG. 6 shows an example of the power transmitted in a certain advertising channel at the frequency $f_{ac}$ as a function of time (top) and the corresponding RSSI signal measured by the transceiver unit 30 (bottom). The "useful" signal, i.e., the data signal transmitted by the transmitting device 38, is shown in solid lines in FIG. 6, whereas an interfering signal present in the advertising channel (such as a WiFi signal) is indicated in dashed lines in FIG. 6.

Typically, the useful signal is received periodically, so that it is appropriate to conduct an RSSI measurement during a certain listening period $T_{listen}$, which is periodically repeated at the times T, 2T, 3T, etc. (i.e., repetition period of the useful signal is denoted by T in FIG. 6), when reception of a useful signal via the link 16 is to be expected. According to the example shown in FIG. 6, the listening period is divided into a guard period $T_{guard}$ followed by an observation period $T_{window}$. The width of the observation period may be selected according to the expected variations of the periodicity of the useful signal, as caused by clock deviations of the communicating devices in the system and the expected jitter.

In order to ensure that the antenna tuning is not disturbed by the presence of an interferer, the control unit 36 is adapted to judge whether or not there is an interferer present during each listening period and to discard results obtained during listening periods having been disturbed by an interfering signal.

According to the example shown in FIG. 6, two conditions must be fulfilled in order to have the control unit 36 judge that no interferer is present: first, there must be no signal detected within the guard period having an RSSI amplitude above a given minimum signal threshold $RSSI_{min}$, and, second, the variation of the RSSI amplitude during the observation period, at times where the RSSI amplitude is above the minimum signal threshold $RSSI_{min}$, must not exceed a given signal variation range $\Delta_{RSSI}$.

The minimum signal threshold $RSSI_{min}$ typically is selected according to an average "noise level" in the respective advertising channel.

The allowable signal variation range $\Delta_{RSSI}$ may be selected according to possible variation of effectively radiated transmit power over the duration of the data transmission in the advertising channel, receiver noise and accuracy and resolution of the RSSI measurement.

The check concerning the signal amplitude variation typically is started once the measured RSSI amplitude has reached a first peak value (as indicated at times $t_1$ in the first observation period around T and time $t_2$ in the second observation period around 2T, respectively). Thereby, transient signal amplitude changes having a slope steepness above a given threshold should be excluded when determining whether the signal variation is within the given signal variation range. It is then checked whether the RSSI amplitude, after having reached the first peak value, neither increases nor decrease by more than half of the allowable signal variation $\Delta_{RSSI}$. As can be seen from FIG. 6, during the first listening period around T both conditions (RSSI amplitude is below minimum signal threshold $RSSI_{min}$ during the guard period and signal variation is within the allowable signal variation range $\Delta_{RSSI}$ in the observation period during times when the signal is above the minimum signal threshold) are fulfilled, so that RSSI measurement of the first observation period is judged to be valid.

By contrast, in the second listening period around 2T the first condition concerning the guard period still is fulfilled, but the second condition concerning the signal variation is violated due to the presence of an interfering signal in the second listening period, so that the result of the second listening period would be discarded.

In the third listening period around 3T the first condition concerning the guard period is violated due to the presence of interfering signal, so that also the measurement result of the third listening period would be discarded, although the second condition concerning the signal variation would be fulfilled.

An alternative way of validating the correctness of a certain RSSI measurement of a useful signal would be to decode the corresponding data packet transmitted as the useful signal in the advertising channel. As the data packet typically contains a CRC value, an interference condition would be depicted in case that the packet is corrupted, so that the corresponding RSSI measurement would be discarded. However, since the decoding of the full package is expected to result in a higher current consumption, measurement of the RSSI value without packet decoding is preferred. Further, both approaches of validating the correctness of the RSSI measurement may be combined, in particular in cases in which the packet received in the advertising channel has to be received and decoded anyway for communication purposes.

What is claimed is:

1. A hearing aid, comprising:
   a transceiver unit for establishing a wireless communication link using a digital modulation scheme with a packet-based frequency hopping scheme including an advertising channel, wherein the transceiver unit is configured to receive audio data;
   an antenna;
   an antenna tuning circuit physically coupled to the transceiver unit and the antenna for tuning the antenna,
      wherein the transceiver unit is adapted to estimate strength of signals received in the advertising channel and to transmit a control signal partially based on the estimated strength of signals;
      wherein the antenna tuning circuit is adapted to tune the antenna partially based on the control signal, wherein tuning the antenna includes reducing a frequency range for transmission or increasing transmission strength of signals associated with the advertising channel, and
      wherein the transceiver unit is adapted to judge whether an interferer is present during the estimation of the received strength of signals in the advertising channel and to use the respective estimation of the received strength of signals only in case that it has been judged that there is no interferer present.

2. The hearing aid of claim 1 wherein the hearing aid is a body worn device.

3. The hearing aid of claim 1 wherein the hearing aid is to be worn at ear level.

4. The hearing aid of claim 1, wherein the frequency hopping scheme uses frequencies from 2.400 to 2.484 GHz.

5. The hearing aid of claim 1, wherein the advertising channel is a first advertising channel of multiple advertising channels, wherein the multiple advertising channels are evenly distributed over the frequencies used by the frequency hopping scheme.

6. The hearing aid of claim 1, wherein the estimated strength of signals are associated with received signal strength indicator (RSSI) values.

7. The hearing aid of claim 1, wherein the transceiver is further configured to estimate an amplitude of a gain regulation loop in an automatic gain control (AOC) unit.

8. The hearing aid of claim 1, wherein the transceiver is adapted to control the tuning circuit to tune the antenna such that the estimated strength of signals in the advertising channel is increased.

9. The hearing aid of claim 1, wherein the transceiver is adapted to control the tuning circuit in a manner so as to tune the antenna such that variation of the strength of signals in the advertising channel is decreased.

10. The hearing aid of claim 1, wherein the transceiver unit is adapted to conduct an estimation of the received strength of signals during a listening period.

11. The hearing aid of claim 10, wherein the listening period is divided into a guard period followed by an observation period, wherein the control unit is adapted to decide that there is no interferer if no signal with an amplitude above a given minimum signal threshold is detected within the guard period and if the variation of the detected signal within the observation period, at times where the signal amplitude is above the minimum signal threshold, is within a given signal variation range.

12. The hearing aid of claim 11, wherein the transceiver unit is adapted to exclude transient signal amplitude changes having a slope steepness higher than a given threshold, when determining whether the variation of the detected signal is within the given signal variation range.

13. The hearing aid of claim 12, wherein the transceiver is adapted to determine when a first peak value of the signal amplitude is reached within the observation period, and wherein the center value of the given signal variation range is set to the first peak signal amplitude value, so that is decided that there is an interferer once the signal amplitude exceeds the first peak signal amplitude value by at least half of the width of the signal variation range or falls below the first peak signal amplitude value by at least half of the width of the signal variation range.

14. The hearing aid of claim 10, wherein the audio device is adapted to decode a data packet received in the at least one advertising channel during the estimation of the received signal strength and to determine whether or not the data packet has been correctly received, and wherein the control unit judges that an interferer is present in case that the data packet has not been correctly received.

15. A method of operating a hearing aid, the method comprising:
    establishing a wireless communication link between a hearing aid and an external device by using a digital modulation scheme with a packet-based frequency hopping scheme including an advertising channel;
    estimating, by the hearing aid, strength of signals received in the advertising channel, and
    tuning the antenna partially based on a signal representative of the estimated strength of signals in the advertising channel, wherein tuning includes reducing a frequency range for transmission or increasing transmission strength of signals associated with the advertising channel;
    decoding an audio data packet in the advertising channel during the estimation of the received signal strength; and
    determining an interferer is present based on determining the audio data packet has not been correctly received.

16. The method of claim 15, wherein the advertising channel is a first advertising channel of multiple advertising channels, wherein the multiple advertising channels are evenly distributed over the frequencies used by the frequency hopping scheme.

* * * * *